United States Patent [19]

Engle

[11] 3,745,529

[45] July 10, 1973

[54] TROUBLE ALARM DEVICE FOR TRANSMISSION SYSTEM

[75] Inventor: Roger E. Engle, Anaheim, Calif.

[73] Assignee: Trivex Inc., Costa Mesa, Calif.

[22] Filed: Dec. 27, 1971

[21] Appl. No.: 212,574

[52] U.S. Cl. ..... 340/146.1 E, 178/69 G, 340/324 A

[51] Int. Cl. ..... G08c 25/00

[58] Field of Search ..... 340/146.1 R, 146.1 E, 340/324 A; 235/153 R; 178/23 A, 69 G

[56] References Cited

UNITED STATES PATENTS

| | | | |
|---|---|---|---|
| 3,331,922 | 7/1967 | Neiswinter et al. | 178/69 G |
| 3,396,368 | 8/1968 | Lakhani | 340/146.1 R |
| 3,609,743 | 9/1971 | Lasoff et al. | 340/324 A |
| 3,624,295 | 11/1971 | Pederson | 178/69 G |
| 3,648,272 | 3/1972 | Schroder et al. | 340/324 A |
| 3,668,314 | 6/1972 | Rosseau | 178/69 G |

*Primary Examiner*—Charles E. Atkinson
*Attorney*—Alan R. Fowler, James B. Bear et al.

[57] ABSTRACT

In association with a data terminal having provision for receiving or locally generating data signals and translating the signals into video signals to cause the symbols represented by the signals to be displayed on a cathode ray tube, a communication channel assurance system is disclosed. The system comprises a video signal inversion device controlled by a timer that monitors the communication channel for the presence of incoming data signals. Such signals repetitiously recycle the timer, but upon a cessation of signals for a predetermined interval the timer times out and causes inversion of video signals, thereby reversing the symbol and background tones of the display on the cathode ray tube.

11 Claims, 1 Drawing Figure

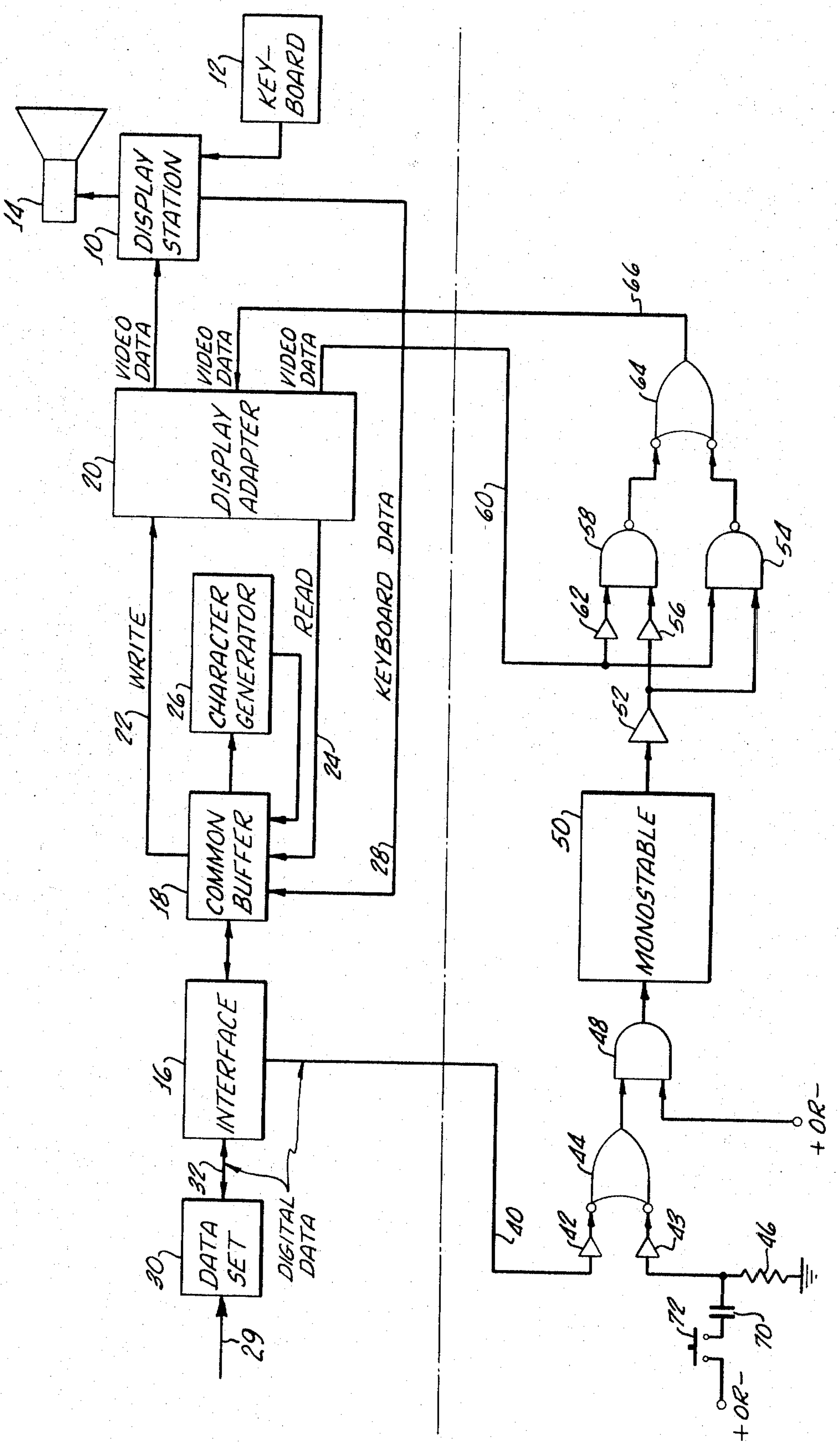
KEY-BOARD
DISPLAY STATION
VIDEO DATA
VIDEO DATA
VIDEO DATA
DISPLAY ADAPTER
WRITE
CHARACTER GENERATOR
READ
KEYBOARD DATA
COMMON BUFFER
INTERFACE
DATA SET
DIGITAL DATA
MONOSTABLE
+ OR −
+ OR −

TROUBLE ALARM DEVICE FOR TRANSMISSION SYSTEM

BACKGROUND OF THE INVENTION

Data processing systems of considerable sophistication and complexity have come into widespread use. Part of such a system may be a computer, and the computer may serve many data terminals over communication channels, usually voice telephone circuits, in which case the telephone lines terminate in data sets which make translations between digital data signals and voice frequency tones that telephone equipment including repeaters will handle. The data terminal stations served by the computer are provided with digital data signal generating devices, such as a keyboard, with means for storing data signals transmission, such as shift registers and magnetic tape devices, and with means for displaying symbols represented by digital data signals generated locally or received over the telephone line, and the cathode ray tube has been found to be a convenient display device.

One mode of operation of systems of this type is to poll the various stations of the system for data traffic that has been stored and is awaiting transmission, and to initiate transmission from the terminals that have traffic, in response to their polling signals. In such systems, data traffic for transmission is prepared by means of a keyboard, using the cathode ray tube display device to monitor the data storing operation. Upon completion of the storing of a block of data the operator initiates a request to send, the effect of which is to cause the transmission of the block in response to the next reception by the station of its own assigned polling signal.

It will be apparent that failure anywhere in the communication channel connecting the data terminal to the computer, failure in the computer itself or in the data set through which the data terminal is associated with the communication channel, will prevent the picking up of data at the data terminal for transmission to the computer and will also preclude the reception of data from the computer. Accordingly, there is a need that data terminal stations be made aware of the occurrence of failures of this type.

SUMMARY OF THE INVENTION

The present invention utilizes the unique characteristic of the cathode ray tube as a display device that inversion of the color tones as between indicia displayed on the screen of the tube and the background may be accomplished by inverting the video signals that produce the display. In accordance with the invention there is provided, in a data sending-receiving station which has keyboard facilities for generating data signals for transmission to a remote point and a cathode ray tube display set for displaying symbols represented by data signals being generated by received data signals and by the keyboard for transmission, a monostable two-state device having its input or triggering terminal connected to the circuitry of the station that receives digital data signals, so that the triggering terminal of the monostable device is repetitiously pulsed by the received digital data signals. The self-restoring or resetting time of the monostable device is set to exceed the intervals between polling signals received by the station for the purpose of initiating data transmission from the station. An output terminal of the monostable device is connected to control a system of logic gates in such a way that one of the gates is enabled when the monostable device is in its triggered or unstable state and another is enabled when the monostable device is in its stable or reset state. The video signal transmission path between the video signal generator and the cathode ray tube is branched into two paths and routed through the two gates with an inverter included in the path to the input of one of the two gates. Thus the display on the cathode ray tube will have one color tone relation of indicia to background if the monostable device remains triggered responsive to the normal reception of the polling signals, and will show an inverted relation of indicia to background if the reception of polling signals ceases and the monostable device times out. The cathode ray tube, being such a prominent part of the receiving station will be readily noticeable by an observer, who can initiate steps to correct the malfunction.

DESCRIPTION OF THE DRAWING

A more complete understanding of the invention may be had from the following detailed description to be interpreted in the light of the accompanying drawing which is a partially block diagrammatic and partially schematic representation of a data terminal station embodying the present invention.

DETAILED DESCRIPTION

Referring now to the drawing, it will be noted that a broken line divides the drawing into two parts. The block diagram portion of the drawing, above the line, has been derived from a manual carrying the identification "Form A27–2700–4" published by the International Business Machines Corporation and carrying a Copyright Notice dated 1968, 1969. The subject of the manual is "IBM 2260 Display Station" and "IBM 2848 Display Control."

The schematically shown circuitry appearing below the line represents the preferred embodiment of the present invention, and connections have been extended across the broken line from the portion appearing above to the portion appearing below to show how the present invention is functionally associated with the apparatus represented by the block diagram shown above the line.

For the complete understanding of the functional and operating characteristics of the IBM 2848 Display Control and the IBM 2260 Display Station reference may be had to the hereinbefore identified manual, the contents of which are incorporated herein by reference to the extent necessary to understand the operation of the IBM system. It will be understood, however, that the utilization of the present invention is not limited to the specific system disclosed in the manual but is usable with other systems for sending and receiving digital data signals and employing cathode ray tubes as the instrumentalities for displaying the data. It will in fact be recognized that other prior art systems employ components corresponding functionally to those shown above the line in the drawing.

Referring now to the portion of the drawing above the line, that portion of the system that is described in the manual as the Display Station is a single rectangle carrying that designation further designated herein by the reference numeral 10. Basically it is an input-output device in which the input device is a keyboard 12 and the output device is a cathode ray tube 14. The designation "Display Control" encompasses all of the rest of the apparatus appearing above the line and is comprised of an Interface device for receiving and transmitting digital data signals in bit serial format to a computer or other data processing device associated directly with the Interface or indirectly over a communication channel, and to feed received digital data signals, sometimes translated into bit-parallel format, for translation into video signals. A Common Buffer 18 serves as a controller to transfer data into a Display Adapter 20 over a Write Path 22 and to read data out of the Display Adapter 20 over a Read Path 24. The Common Buffer 18 has associated with it a Character Generator 26 which generates, under the control of digital data signals, appropriate video signals for causing signals corresponding to the data signals to be displayed on the cathode ray tube 14 associated with the Display Station 10. Data signals generated by the keyboard 12 of the Display Station 10 are supplied over a path 28 to the Common Buffer 18, and signals impressed on the Common Buffer 18 over the path 28 may be processed by the Buffer 18 the Character Generator 26 and the Display Adapter 20 in the same manner as received signals, for displaying the corresponding symbols on the cathode ray tube 14. When the Display Control is to be associated with a remote data processing device over a communication channel, identified herein by the reference numeral 29, and particularly over voice telephone circuits it is customary to terminate the telephone channel in a Data Set 30 which is connected to the Interface 16 by a two-way path 32 for passing digital data signals back and forth between the two components. Essentially the Data Set 30 is a modulator-demodulator, and a unit suitable for this purpose is the commercially available Bell System Data Set 202.

In operation, upon the establishment of a telephone transmission channel connection between the Data Set 30 and a remote computer data may be generated by the manipulation of the keyboard 12 to cause the data to be impressed upon the Common Buffer 18 and displayed on the cathode ray tube 14. The data signals may be stored in a memory which is a part of the Display Control above the broken line in the drawing. Upon storing of a block of data to be transmitted the operator depresses a key which initiates a request-to-send status, establishing an operative condition indicative of the fact that data is awaiting transmission.

In the meantime, with the station connected to a remote computer through a communication channel the computer station generates and transmits over the communication channel, at some predetermined repetition rate, a polling signal which is effective upon being received by the Display Control, to initiate transmission of a block of data for which the request-to-send status had been activated. After the block has been transmitted, and until another block has been readied for transmission by being stored and having the request-to-send status activated, the computer continues to send and the station receives the polling signals until the station is disconnected from the communication channel.

Turning attention now to the portion of the drawing below the broken line it will be noted that a path 40 has been brought from the Interface 16 through an inverter 42 and connected to one of the input terminals of a Nand gate 44. The other terminal of the Nand gate is returned to ground through an inverter 43, and a resistor 46 which is part of a pulse integrating circuit as will be described hereinafter. The path 40 from the Interface 16 is connected in the Interface to have the received bit-serial digital signals impressed upon it, and thus an inversion of these signals will be impressed upon the upper input of the Nand gate 44 and a repetition of those signals will appear on the output of the gate 44. The output of that gate is connected to one of the inputs of the two-input And gate 48 which has its other input at a fixed potential, which may be of either postive or negative polarity as required by the circuitry components. As the gate 48 follows the output of the gate 44 pulses will appear at the output of the gate 48.

The output of the gate 48 is connected to the single input terminal of monostable two-state device or One-Shot 50. The self-restoration time of the One-Shot 50 from its triggered or unstable state to its stable state exceeds the interval between polling signals at their normal repetition rate. The pulses applied to the One-Shot 50 as a result of received signals repetitiously recycle the One-Shot 50 to its full timing cycle so that it will not restore so long as the intervals between signals do not exceed its full timing interval.

The output of the One-Shot 50 is connected through an inverter 52 directly to one of the input terminals of the Nand gate 54 and through an additional inverter 55 to an input terminal of another Nand gate 58.

Attention is now directed to a path 60 that is brought out from the Display Adapter 20 of the display control and over which the video data signals are impressed upon the other input terminal of each of the gates 54 and 58, directly in the case of the gate 54 and through an inverter 62 in the case of the gate 58.

The outputs of the two gates 54 and 58 are connected to the two inputs of a Nand gate 64 the output of which is connected over a path 66 over which the video data signals passed through the gate system re-enter the Display Adapter 20, from which they pass over path 21 to the Display Station 10 to control the cathode ray display tube 14.

The gates 54 and 58 serve as enabling gates to pass the video data signals through one or the other of those gates and thence through the gate 64 to the Display Station 10. Because of the inclusion of the inverter 62 in the video data path to the gate 58 and the absence of such an inversion device in the video data path to the gate 54 the video signals passing through the gates 54 and 58 to reach the Display Station 10 will be inversions of each other.

Likewise, inversions of the output condition of the One-Shot 50 will be impressed upon the gates 54 and 58 by virtue of the inclusion of the inverter 56 in the path of control of the gate 58 and the absence of such an inverter in the path of control of the gate 54. It follows from this that when the One-Shot 50 is in its triggered or unstable state the video signals will be passed through one of the gates 54 and 58 and that when it is in its stable state the video signals will be passed through the other of the two gates, and the two types of signals will be inversions of each other. The result of this is that the color tones of symbols and background on the screen of the cathode ray tube 14 will be subject to inversion. In one condition the symbols will be displayed in white on a black background, (for example) and in the other the symbols will be displayed in black on a white background. Even if there is no data or pattern on the screen, but merely background, at the time that an inversion of the video signal occurs the inversion will become apparent to the viewer because the entire background will switch from one to the other of the two tones. From the foregoing it will be apparent that when digital data signals are being received, including a situation where these are only the polling signals, and data is being stored by operation of the keyboard for subsequent transmission, with sttendant displaying of the data on the cathode ray tube step by step as the data is being recorded, and the reception of signals at the input ceases, due to a failure in the computer that is originating the signals, or in the communication channel or in the Data Set, for a sufficient interval to permit the One-Shot 50 to restore, the color tones on the cathode ray tube screen will invert and thereby serve as an alarm to make an attendant aware of the failure.

Mention was made previously of a pulse integrating circuit including the resistor 46 through which the lower input terminal of the gate 44 receives its steady state voltage. The integrating circuit includes a capacitor 70 having one terminal connected to the lower input terminal of the gate 44 and its other terminal connectable through a push button switch 72 to a source of potential indicated as selectably having a polarity of plus or minus. The purpose of the push button switch 72 is to test the functioning of the entire video signal inverting system. When the switch 72 is operated momentarily a pulse is applied through capacitor 70 to the lower input terminal of the gate 44 and it is of sufficient magnitude and duration to trigger the One-Shot 50. Assuming it has been in its stable state an inversion of color tones will occur on the screen of the cathode ray tube 14. As the capacitor discharges through resistor 46 the input to the One-Shot 50 will return to its non-triggering state, the One-Shot will time out and reinvert the color tones on the screen of the cathode ray tube 14. Thus there is provided a manual check on the operativeness of the video signal inverting system.

In accordance with a common practice, a number of inverters have been included in the logic circuitry which have as their purpose either the isolation of one component from another or the provision of proper voltages and/or polarities at the inputs of logic devices. Examples of these are the inverters 42, 43 and 52. However, the inverters 56 and 62 perform functionally needed inversions, since in each instance it is included in one of two branching paths driven from a common source.

What is claimed is:

1. A data receiving station comprising:
means for receiving digital data signals;
means controlled by said signal receiving means for converting digital signals to video signals; and
cathode ray tube means for displaying symbols represented by said video signals wherein the improvement comprises:
means interposed between said converting means and said cathode ray tube means for presenting for utilization by the cathode ray tube means two inversions of said video signals one of which is an inversion of the other; and
means for selecting one or the other of said versions of the video signals for presentation to said cathode ray tube means as an indicator of a predetermined status of the signal receiving means.

2. A combination in accordance with claim 1 wherein the selecting means is controlled by received digital data signals.

3. A combination in accordance with claim 1 wherein said selecting means includes a timing device controlled by received signals so as to cause the selecting means to select a predetermined one of the two versions of said video signals until cessation of signals for an interval exceeding a predetermined duration.

4. A combination in accordance with claim 3 wherein said timing device is a monostable two-state device connected to the digital signal receiving means to be settable to its unstable state by received digital signals.

5. A combination in accordance with claim 4 wherein received digital signals repetitiously reset said two-state device to its full timing interval to qualify it to monitor said digital signal receiving means for signal cessations exceeding said predetermined interval.

6. A combination in accordance with claim 1 wherein:
said means for presenting two versions of said video signals comprises two video signal transmission paths each including a gate controlled by said selecting means so that the selecting means enables one or the other of the gates to pass video signals.

7. A combination in accordance with claim 6 wherein one of said video signal transmission paths includes preceding the gate therein an odd number of inverters for presenting to its associated gate the inversion of the signal on the other video signal transmission path.

8. A combination in accordance with claim 6 including an OR gate having its inputs connected to the outputs of the gates in said two video signal transmission paths for passing video signals from either of those gates to said cathode ray tube means.

9. A combination in accordance with claim 2 having manually operable means for controlling said selecting means independently of received digital signals for checking its operativeness.

10. Apparatus in accordance with claim 4 including a manually operable key and a pulse differentiating network for pulsing said two-state device independently of received digital signals for checking the operativeness of the video signal inverting system.

11. A data receiving station comprising:
means for receiving digital data signals;
means controlled by said signal receiving means for converting digital signals to video signals; and
cathode ray tube means for displaying symbols represented by said video signals wherein the improvement comprises:
a timing device monitoring the operation of said signal receiving means and having one operative condition during signal reception at a predetermined minimum rate and another operative condition upon cessation of signals for an interval exceeding a predetermined duration;
means interposed between said converting means and said cathode ray tube means for deriving for utilization by the cathode ray tube means two versions of said video signals one of which is an inversion of the other; and
means controlled by said timing means in accordance with one or the other of its two operative conditions for passing one or the other of said two versions of said video signals to said cathode ray tube means.

* * * * *